J. L. G. SCHMIDT.
CORN-PLANTER.

No. 186,275.  Patented Jan. 16, 1877.

UNITED STATES PATENT OFFICE.

JOHN L. G. SCHMIDT, OF PETERSBURG, ILLINOIS.

IMPROVEMENT IN CORN-PLANTERS.

Specification forming part of Letters Patent No. 186,275, dated January 16, 1877; application filed November 18, 1876.

*To all whom it may concern:*

Be it known that I, JOHN L. G. SCHMIDT, of Petersburg, in the county of Menard and State of Illinois, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in walking corn-planters; and it consists in the arrangement and combination of parts, that will be more fully described hereinafter, whereby a cheap, simple, and effective machine is produced.

Figure 1:
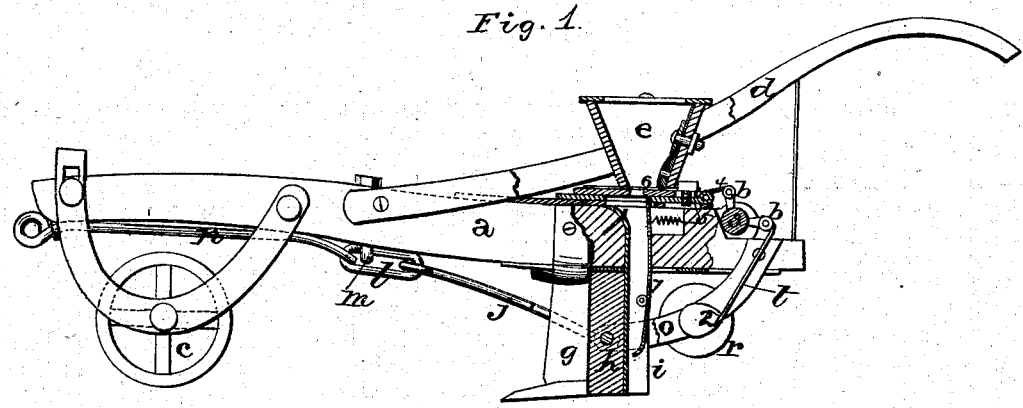
Figure 2:
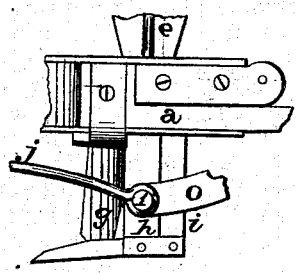

Figure 1 is a side elevation of my planter complete. Fig. 2 is a detail view of the same.

$a$ represents the beam; $c$, the caster-wheel; $d$, the handles; $e$, the hopper; and $g$, the furrow-opener, all constructed in the usual manner. Just in the rear of the opener $g$ is the rigid bar or beam $h$, which extends down to the earth, and to the rear side of this is secured the grain-tube $i$, through which the grain falls from the hopper. From each side of this bar $h$ projects studs 1, to which is secured the rod or brace $j$, which is doubled on itself, so as to be fastened to both sides of the bar. Attached to the front end of this brace $j$ is the long link $l$, which is held up against the under side of the beam by a hooked screw-bolt, $m$, so as to prevent it from sagging down. This link has a slight endwise play, and has the draft-rod $n$ fastened to its front end. Thus it will be seen that the whole of the draft is applied directly behind the center of the furrow-opener $g$, just where the whole strain of the machine comes. By thus applying the draft at this point, not only is it easier for the team to draw the machine, but the machine will stand more wear and tear. Extending backward and upward from the studs 1 to the rear end of the beam are two plates, $o$, between which is journaled the small wheel $r$, which runs along on top of the ground. Upon one end of the journal of this wheel is secured a crank, 2, to which the connecting-rod $t$ is attached, which rod causes the rock-shaft 3 to play back and forth. Attached to the upper one of the two arms $b$, that extend out from this rock-shaft, is a short connecting rod or link, 4, which connects the rock-shaft with the seed-slide 5, that moves back and forth through the bottom of the hopper. Upon the top of the seed-slide is clamped a slotted adjustable plate, 6, for regulating the amount of grain to be dropped. Pivoted in the rear part of the grain-tube $i$ is the vibrating valve 7, the upper end of which catches in the under side of the seed-slide, so that as the slide moves back and forth the valve is closed at its lower end to catch the grain as it falls, and then opened to deposit it in the ground.

By securing the two plates $o$ to the studs 1, it will be seen that the backward pull of the wheel $r$ is also brought to bear on the center of the bar $h$, and thus counterbalances, to a certain extent, the forward draft of the team.

To one side of one of the handles is attached or held by suitable staples a pin, which is placed in the ground on a mark, thereby starting the planter, and dropping in line with the others, making straight rows, and enabling the farmer to plow both ways with equal facility.

Having thus described my invention, I claim—

The combination of the bar $h$, brace $j$, link $l$, and draft $n$, with the plates $o$ and wheel $r$, whereby the draft of the team and the backward pressure of the wheel are made to counteract each other to a certain extent, as described.

In testimony that I claim the foregoing I have hereunto set my hand this 3d day of November, 1876.

JOHN L. G. SCHMIDT.

Witnesses:
ALBERT F. OELTJEN,
JOHN VAN BUREN.